US007554981B2

(12) United States Patent
Kecskemeti

(10) Patent No.: US 7,554,981 B2
(45) Date of Patent: Jun. 30, 2009

(54) SYSTEM AND METHOD FOR EFFICIENT STORAGE AND PROCESSING OF IPV6 ADDRESSES

(75) Inventor: Delia Kecskemeti, Kanata (CA)

(73) Assignee: Wind River Systems, Inc., Alameda, CA (US)

( * ) Notice: Subject to any disclaimer, the term of this patent is extended or adjusted under 35 U.S.C. 154(b) by 873 days.

(21) Appl. No.: 10/723,775

(22) Filed: Nov. 26, 2003

(65) Prior Publication Data

US 2005/0111494 A1    May 26, 2005

(51) Int. Cl.
*H04L 12/56* (2006.01)
(52) U.S. Cl. .................. 370/392; 370/474; 370/475
(58) Field of Classification Search .............. 370/392, 370/474, 475
See application file for complete search history.

(56) References Cited

U.S. PATENT DOCUMENTS

| 6,865,611 | B1 * | 3/2005 | Bragg | 709/238 |
| 2003/0193956 | A1 * | 10/2003 | Dietrich | 370/395.31 |
| 2004/0264465 | A1 * | 12/2004 | Dunk | 370/392 |
| 2005/0018683 | A1 * | 1/2005 | Zhao et al. | 370/393 |
| 2005/0083944 | A1 * | 4/2005 | Liu et al. | 370/395.5 |

OTHER PUBLICATIONS

R. Hinden et al., RFC 3513, *Internet Protocol Version 6(IPv6) Addressing Architecture*, Apr. 2003, pp. 1-26.
R. Coltun et al., RFC 2740, *OSPF for IPv6*, Dec. 1999, pp. 1-80.
S. Deering et al., RFC 2460, *Internet Protocol, Version 6 (IPv6) Specification*, Dec. 1998, pp. 1-39.
J. Moy, RFC 2328, *OSPF Version 2*, Apr. 1998, pp. 1-244.
J. Moy, RFC 2178, *OSPF Version 2*, Jul. 1997, pp. 1-211.
J. Moy, RFC 1583, *OSPF Version 2*, Mar. 1994, pp. 1-216.
J. Moy, RFC 1247, *OSPF Version 2*, Jul. 1991, pp. 1-189.
Information Sciences Institute, RFC 791, *Internet Protocol*, Sep. 1981, pp. 1-45.
Wind River Systems, Inc., *WindNet™ OSPF Datasheet*, Copyright 2001.

* cited by examiner

*Primary Examiner*—Jason E Mattis
(74) *Attorney, Agent, or Firm*—Fay Kaplun & Marcin, LLP

(57) ABSTRACT

A preferred method and algorithm of compressing IPv6 addresses is presented which ensures smaller memory occupancy for IPv6 routing tables and databases in general (applicability to particular case of databases of the routing protocol OSPF for IPv6 is described). A method and algorithm of comparison of such compressed IPv6 addresses without decompression is presented, a method of comparison that ensures in the majority of cases better comparison performance than for the case of comparing uncompressed IPv6 addresses. Also, a preferred method and algorithm of decompressing IPv6 addresses that were compressed using this preferred format is given, and a method and algorithm of comparison of an uncompressed IPv6 address with a compressed IPv6 address without decompression. The exemplary comparison methods may achieve or exceed comparable performance with the performance of comparing uncompressed addresses. Illustrations for the particular case of the routing protocol OSPF for IPv6 are presented for all cases.

8 Claims, 18 Drawing Sheets

| ... | Destination IP Address | Subnet Mask | ... | Route Path | ... | Cost | ... |
|---|---|---|---|---|---|---|---|
| | 140.252.13.65 | 255.255.0.0 | | 140.252.13.35 | | 4 | |
| | 127.0.0.1 | 255.255.255.255 | | 127.0.0.1 | | 0 | |
| | default | | | 140.252.13.33 | | 7 | |
| | | | | | | | |
| | | | | | | | |
| | | | | | | | |
| | | | | | | | |
| | | | | | | | |
| | | | | | | | |
| | | | | | | | |
| | | | | | | | |

Figure 1
(Prior Art)

Example of comparison of compressed addresses with same offset and same length: just compare the compression byte, the first 2 bytes and the one before last byte (4 bytes) instead of first 15 bytes which would be compared for uncompressed addresses Address A1 uncompressed → | 12 | 34 | 00 | 00 | 00 | 00 | 00 | 00 | 00 | 00 | 00 | 00 | 00 | 00 | 56 | 78 |

Address A2 uncompressed → | 12 | 34 | 00 | 00 | 00 | 00 | 00 | 00 | 00 | 00 | 00 | 00 | 00 | 00 | 78 | 9a |

Address A1 compressed → | 24 | 12 | 34 | 56 | 78 |

Address A2 compressed → | 24 | 12 | 34 | 78 | 9a |

56 smaller than 78, A1 is smaller than A2

Figure 13(a)

Example of comparison of IPv4 compatible IPv6 addresses: just compare at most 5 bytes (in this particular case, just compare 2 bytes) instead of comparing at least first 12 bytes which would be compared for uncompressed addresses Address A1 uncompressed | 00 | 00 | 00 | 00 | 00 | 00 | 00 | 00 | 00 | 00 | 00 | 00 | 12 | 34 | 56 | 78 |

Address A2 uncompressed | 00 | 00 | 00 | 00 | 00 | 00 | 00 | 00 | 00 | 00 | 00 | 00 | 9a | 34 | 56 | 78 |

Address A1 compressed | c4 | 12 | 34 | 56 | 78 |

Address A2 compressed | c4 | 9a | 34 | 78 | 9a |

12 smaller than 9a, A1 is smaller than A2

Figure 13(b)

Example of comparison of compressed addresses with same offset: just compare the compression byte and first 2 bytes instead of 14 bytes

| Address A1 uncompressed | 12 | 34 | 00 | 00 | 00 | 00 | 00 | 00 | 00 | 00 | 00 | 00 | 00 | 00 | 56 | 78 |

| Address A2 uncompressed | 12 | 34 | 00 | 00 | 00 | 00 | 00 | 00 | 00 | 00 | 00 | 00 | 00 | 56 | 78 | 9a |

| Address A1 compressed | 24 | 12 | 34 | 56 | 78 |

| Address A2 compressed | 25 | 12 | 34 | 56 | 78 | 9a |

SYSTEM AND METHOD FOR EFFICIENT STORAGE AND PROCESSING OF IPV6 ADDRESSES

BACKGROUND INFORMATION

As part of a network, a routing device (a "router") may be deployed in the network in order to forward data from its source to its desired destination. For example, as part of the Internet, routers are deployed which can receive data packets formatted according to the Internet Protocol (IP)—and therefore having a destination "IP address"—and forward those data packets to a network device connected to the router, which may be a device that either has the destination IP address as its address, or has a different IP address but will be able to forward the data packet through the network to reach the network device that has the destination IP address (i.e., another router or host computer connected to the network).

The process of routing is typically performed by accessing a "routing table," which contains entries that indicate how to treat a data packet having a particular destination address. The routing table can be constructed in a number of different ways by routing protocols. One common method uses the "Open Shortest Path First" (OSPF) protocol, which is one of the two standard routing protocols for IP, specified in RFC 1247 (and updated in RFC 1583, RFC 2178 and RFC 2328). As part of the OSPF protocol, each router receives communications from other routers to which it is connected ("link state advertisements"), indicating those IP addresses to which they can provide routes, as well as "cost" information for using those routes. The OSPF protocol is then able to generate entries for the routing table which will allow forwarding of data packets using the fastest transmission path available.

An example routing table constructed using the OSPF protocol is illustrated in FIG. 1. Each table entry includes a destination IP address (or address range, if a subnet mask is specified), a routing path (e.g., the next router to forward to), and a transmission cost value (as well as other fields omitted for purposes of clarity). When a data packet is received by the router, the router compares the destination IP address provided in the data packet to the entries in the routing table, determines which entry most appropriately applies to the data packet, and forwards the packet via the routing path.

Recent developments in the IP protocol have led to the promulgation of a new version of the protocol named "IPv6," and referenced in RFC 2460. The previous version of the IP protocol—named "IPv4"—used a 32-bit (4 byte) IP address format, sometimes presented in "dotted decimal" notation as "x.x.x.x" where each "x" is one byte of the address represented as a decimal number (e.g., "10.34.127.160"). (For additional information on IPv4 addressing, see RFC 791.) With the growth of the Internet, this addressing scheme has become too restrictive, as there is no longer a sufficient number of IPv4 addresses available, and therefore as part of IPv6, IP addresses take a 128-bit (16 byte) address format. These addresses are sometimes presented in hexadecimal notation as "xxxx:xxxx:xxxx:xxxx:xxxx:xxxx:xxxx:xxxx" where each "x" represents a hexadecimal digit and each grouping of four digits represents 2 bytes (e.g., "0000:FFE0:0000:0003: FFFF:FFFF:FFFC:00FD"). (See, for example, RFC 2373 and RFC 3513, for additional textual presentation formats.)

Although the IPv6 addressing scheme alleviates some of the addressing limitations of IPv4, it raises new problems for network devices in its implementation and deployment. For a certain transition period, both IPv4- and IPv6-capable devices will exist on the Internet. In order to access those devices configured for IPv4 addresses, a simple conversion was established—the first 12 bytes of an IPv4 address represented in IPv6 format are set to 0, and the last 4 bytes contain the IPv4 address. These are called IPv4 compatible IPv6 addresses. The IPv6 protocol functionality may be configured to recognize the IPv4 address embedded in the IPv6 address format, and provide the data packet to the appropriate processing modules for IPv4-addressed network traffic.

Another issue raised by the IPv6 addressing scheme is that the amount of memory needed to implement a routing table in a router expands by a significant amount from its implementation under IPv4. For example, each entry in an OSPF routing table compatible with IPv6 will include a 16-byte IPv6 destination address, whereas similar entries in an OSPF routing table under IPv4 would use 4 bytes for the destination IP address. In certain circumstances, adding additional memory to support routing table expansion is undesirable (e.g., too costly) or impossible (e.g., a previously built device being upgraded to IPv6 functionality).

Another issue raised by IPv6 addressing is additional computational cost in routing. In order to determine the appropriate forwarding route for a data packet received by a router, the router must compare the destination IP address in the data packet to entries in the routing table. With IPv4 addresses, this comparison was at most a 4 byte comparison, but with IPv6 this comparison can be up to a 16 byte comparison.

SUMMARY

A first preferred embodiment according to the present invention is described as a method, comprising identifying a chain of zero bytes in an uncompressed IPv6 address, the chain of zero bytes having a chain length and a chain location, and generating a compressed IPv6 address corresponding to the uncompressed IPv6 address by removing the chain of zero bytes from the uncompressed IPv6 address and providing compression information for the compressed IPv6 address, the compression information corresponding to the chain length and the chain location.

A second preferred embodiment according to the present invention is described as a method, comprising identifying compression information of a compressed IPv6 address, the compression information corresponding to a chain length and a chain location of a chain of zero bytes removed from an uncompressed IPv6 address corresponding to the compressed IPv6 address; and generating the uncompressed IPv6 address by adding the chain of zero bytes having the chain length to the compressed IPv6 address at the chain location and eliminating the compression information.

A third preferred embodiment according to the present invention is described as a method, comprising determining a chain location and chain length of a chain of zero bytes removed from a compressed IPv6 address based on compression information of the compressed IPv6 address, the compressed IPv6 address having a number of pre-chain location bytes and a number of post-chain location bytes; comparing pre-chain location bytes of the compressed IPv6 address to corresponding bytes of the uncompressed IPv6 address, and reporting a result when at least one pair of such pre-chain corresponding bytes is different; when no result is reported, comparing bytes of the uncompressed IPv6 address corresponding to the chain of zero bytes, and reporting the result when at least one of the bytes of the uncompressed IPv6 address corresponding to the chain of zero bytes is non-zero; and when no result is reported, comparing post-chain location bytes of the compressed IPv6 address to corresponding bytes of the uncompressed IPv6 address, and reporting the result.

A fourth preferred embodiment according to the present invention is described as a method, comprising determining a first chain location and first chain length of a first chain of zero bytes removed from a first compressed IPv6 address based on compression information of the first compressed IPv6 address, the first compressed IPv6 address having a first number of bytes, including a first number of pre-chain location bytes and a first number of post-chain location bytes; determining a second chain location and second chain length of a second chain of zero bytes removed from a second compressed IPv6 address based on compression information of the second compressed IPv6 address, the second compressed IPv6 address having a second number of bytes, including a second number of pre-chain location bytes and a second number of post-chain location bytes; comparing the compression information of the first compressed IPv6 address to the compression information of the second compressed IPv6 address; and when the compression information of the first compressed IPv6 address and the compression information of the second compressed IPv6 address are equal, comparing the first number of bytes to corresponding ones of the second number of bytes, and producing a result. When the compression information of the first compressed IPv6 address and the compression information of the second compressed IPv6 address are not equal, the method further comprises comparing the first pre-chain location bytes to corresponding ones of the second pre-chain location bytes, and producing the result when at least one pair of such pre-chain corresponding bytes is different; when no result is produced, comparing the first chain location to the second chain location, and producing the result when the first chain location and the second chain location are not equal; and when no result is produced, comparing the first chain length to the second chain length, and producing the result.

A fifth preferred embodiment according to the present invention is described as a method, comprising: receiving an OSPF message containing an LSA having an uncompressed IPv6 address; compressing the uncompressed IPv6 address into a corresponding compressed IPv6 address; and storing the LSA in a link state database, the LSA containing the compressed IPv6 address.

A sixth preferred embodiment according to the present invention is described as a method, comprising: receiving a message containing an IPv6 destination address; comparing the IPv6 destination address to a compressed IPv6 address stored in a routing table, and when the IPv6 destination address matches the compressed IPv6 address, retrieving forwarding information corresponding to the compressed IPv6 address; and forwarding the message according to the forwarding information.

BRIEF DESCRIPTION OF THE DRAWINGS

FIG. 1 is an example OSPF-based routing table.

FIGS. 13(a), 13(b) and 13(c) are examples of application of compressed address comparison methods, according to the present invention.

DETAILED DESCRIPTION OF PREFERRED EMBODIMENTS

In preferred embodiments according to the present invention, a method and system may be implemented that reduces the amount of space needed to accommodate routing of IPv6 formatted data packets. In the preferred embodiment, IPv6 addresses are compressed according to a predetermined format, and may then be stored in, for example, a routing table or link state database of a router device for purposes of determining routing paths for IP data packets received by the device. Received IPv6 data packets may be compared to entries in the routing table without decompression of the IPv6 address data in the table. Use of the compressed IPv6 addresses thereby reduces the amount of space required for storing routing tables and similar networking data structures, without appreciable increase (and in most cases, actually a decrease) in the amount of processing required to perform actions such as IPv6 address lookup for packet forwarding.

The preferred embodiments according to the present invention will now be described with reference to FIGS. 2-16, wherein like-numbered elements across figures refer to the same element in each figure. The preferred embodiments described herein can be implemented as software created to control a computing device when executed by the device. Those of skill in the art will recognize that any or all of the elements described herein may be implemented in either software or hardware, as may be appropriate or convenient. Also, for those elements implemented as software, common software components—data structures, objects, modules, etc.—may be considered "coupled" when it is possible for data to be passed between the components. Also as used herein, data may be "passed" or "exchanged" between elements implemented in software by providing the actual data or by providing a reference (e.g. a pointer) to a location storing the data, as is generally known. To the extent the embodiments described herein are implemented as software to control a programmable device (e.g., a microprocessor), such software may be provided on a computer readable medium (such as magnetic or semiconductive storage) or over a network as a combination of instructions to control such programmable device.

Figure 2:
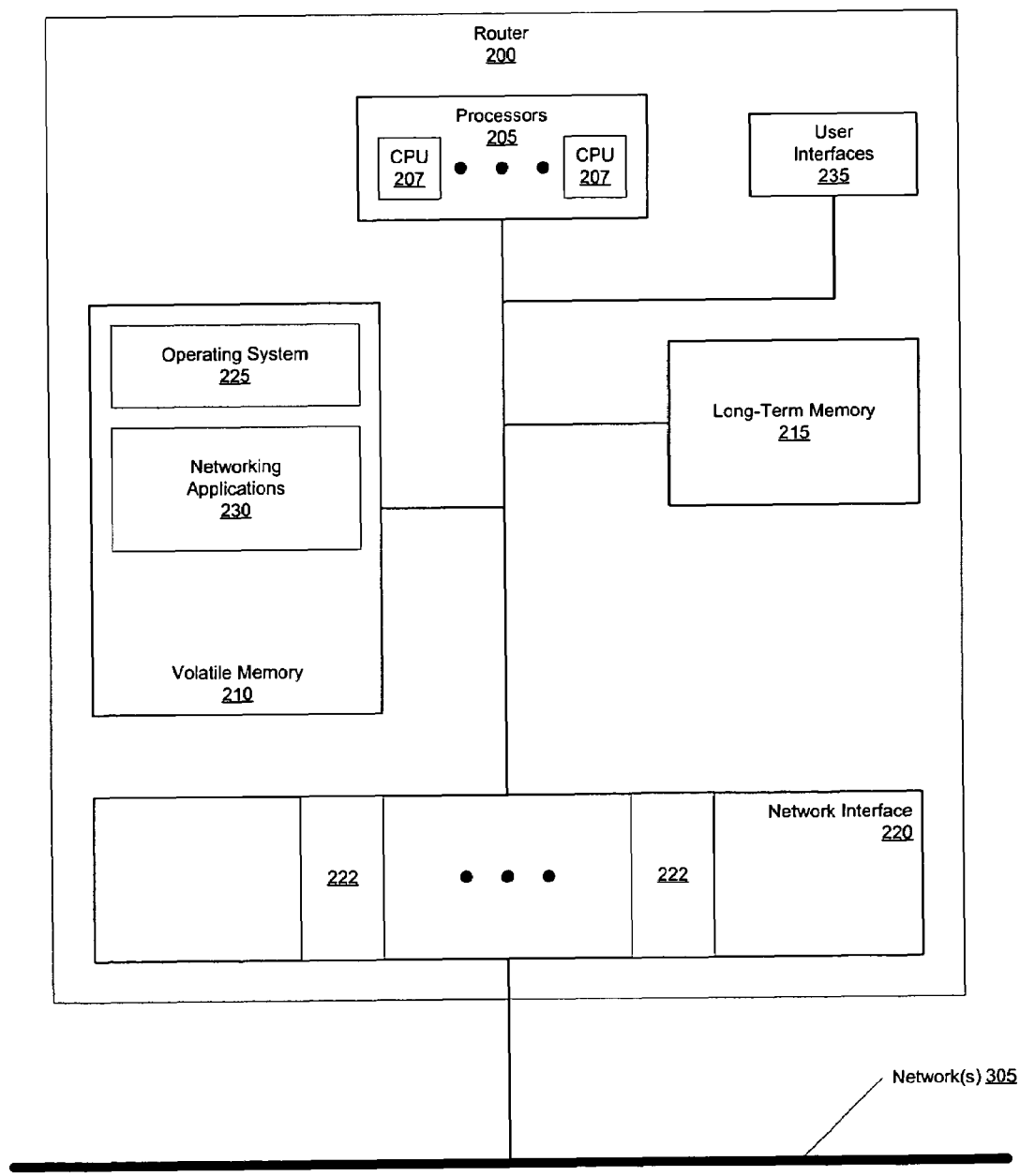
FIG. 2 is a block diagram of an exemplary router, according to the present invention.

FIG. 2 shows a block diagram of a preferred implementation of a router according to the present invention. Router 200 is a computing device that interconnects two or more networks 305, having as hardware components a processing system 205 (having at least one central processing unit (CPU) 207) and local/volatile memory system 210. Router 200 may also have long term storage system 215, such as magnetic disk storage and/or non-volatile semiconductive memory. Router 200 will also include a network interface system 220, which may include one or more network interface units 222. This network interface system 220 can reside on the same printed circuit board (PCB) as the previously mentioned components (the "control card") or can reside on several PCBs ("line cards") interconnected via a connection "backbone" with the control card. Network interface system 220 provides physical access to networks 305. Router 200 also includes software components for its operation, including, for example, an operating system 225 and networking applications 230. Router 200 also includes user interfaces 235, which may be provided to allow users to receive information about the router (e.g., monitoring statistics, configuration screens, etc.).

Figure 3:
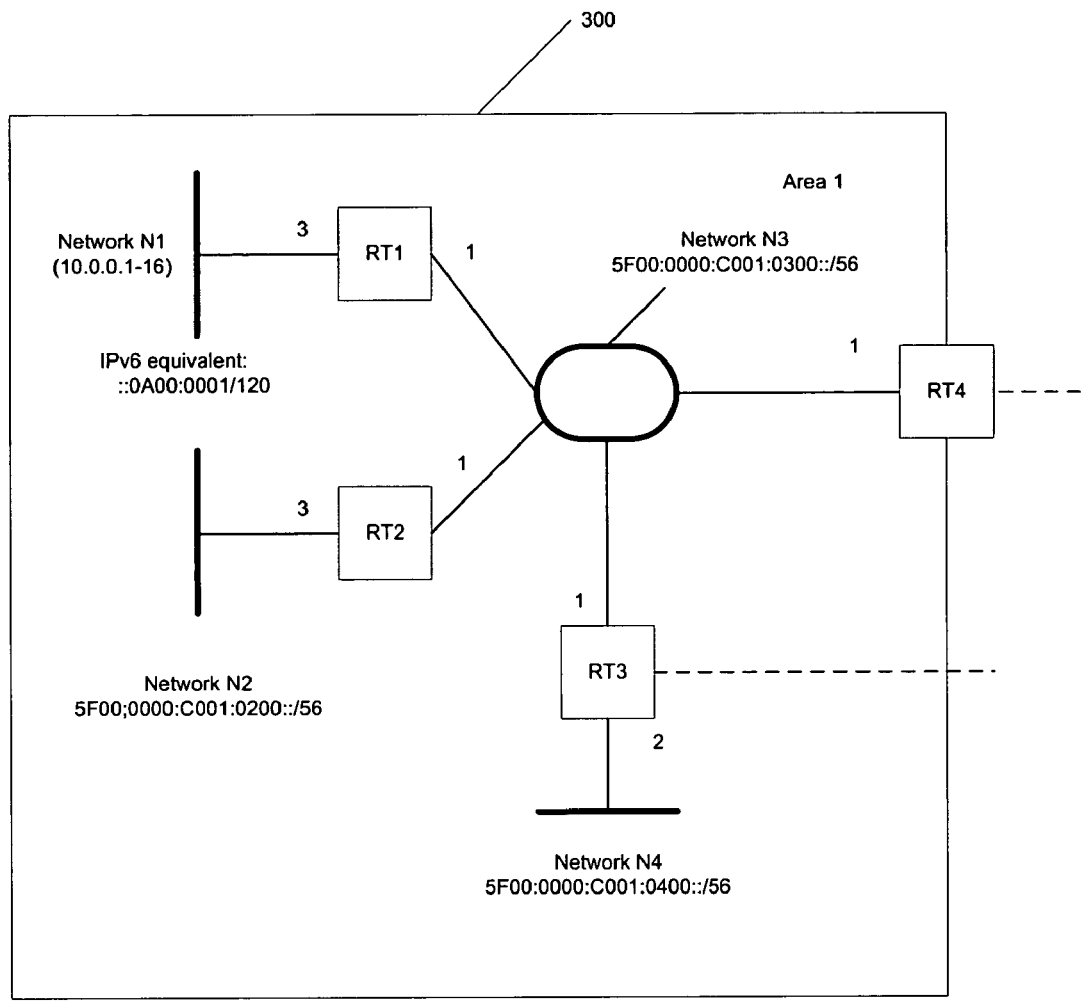
FIG. 3 is a diagram of an exemplary network configuration, according to the present invention.

FIG. 3 shows a diagram of an exemplary network configuration 300, which will be used to illustrate the structure and operation of the preferred embodiments. This exemplary network implements IP protocol networking over one or more physical transport mediums. This network configuration example corresponds to FIG. 1 of RFC 2740, and illustrates a configuration within a single "area" defined per the OSPF protocol. Four routers RT1, RT2, RT3, RT4 (for example, having the configuration of router 200) and four networks N1, N2, N3, N4 are shown. Links between each router and network are shown, including a cost value associated with the link. As shown, several routers may connect to the same network (e.g., routers RT1, RT2, RT3, and RT4 each connect to network N3).

The IPv6 addresses associated with the networks N1, N2, N3 and N4 are also shown in FIG. 3. In this example, network N1 is an IPv4 network, which has been assigned addresses 10.0.0.1-16. In order to co-exist with IPv6 networks (such as N2, N3 and N4), packets to N1 may be addressed in IPv6 form as 0000:0000:0000:0000:0000:0000:0a00:0001 with subnet mask 120 (128−8). As shown in FIG. 3, this address may be textually represented as "::10.0.0.1/120" where the "::" represents an area of characters filled by zeroes and the "/120" represents the number of bits in the subnet mask. Router RT1 is responsible for forwarding IP messages to network N1 according to the requirements of IPv4 and forwarding IP messages from network N1 according to the requirements of IPv6.

Figure 4:
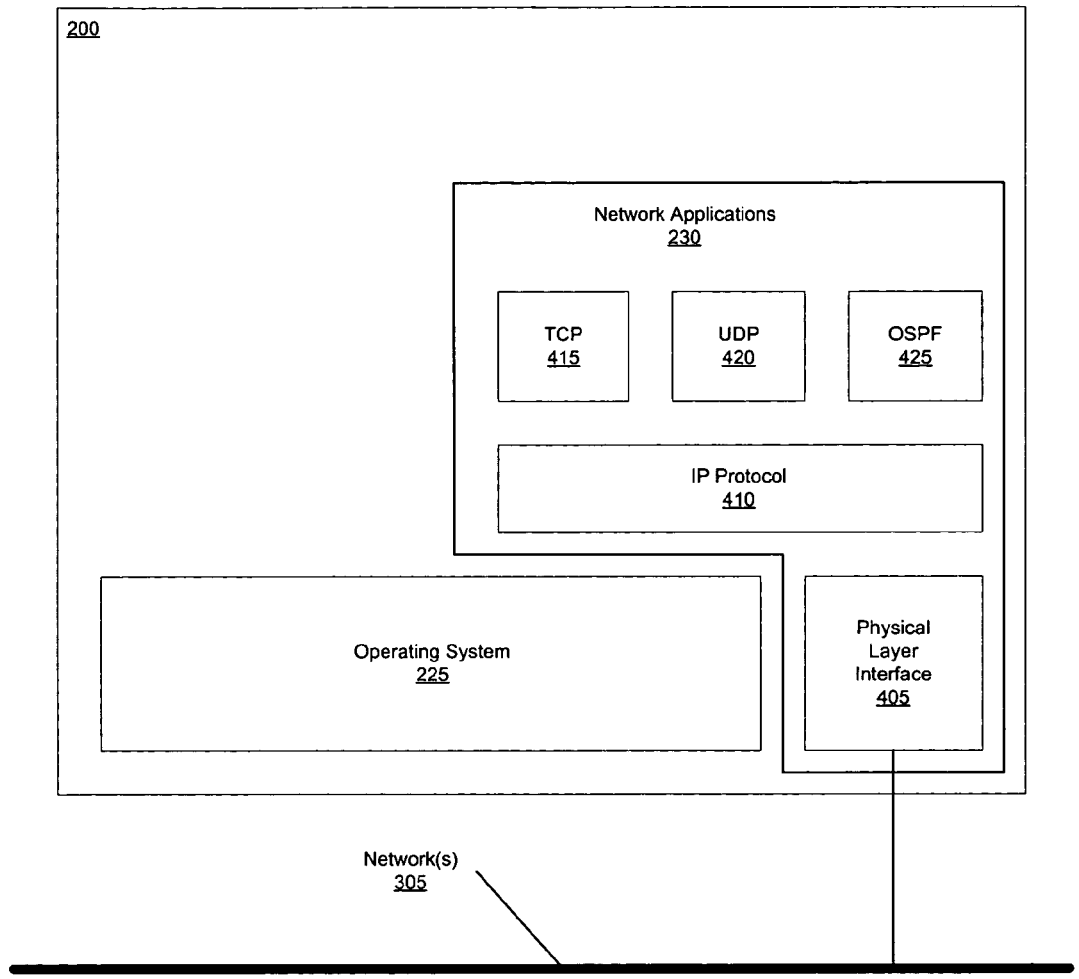
FIG. 4 is a block diagram of exemplary router components in a TCP/IP router, according to the present invention.

FIG. 4 illustrates an implementation of networking facilities within router 200. Networking applications 230 may be executing in conjunction with operating system 225 to provide networking operations. Networking applications 230 may implemented in a configuration commonly known as a "stack"—applications may pass data packets between contiguous "levels" of the stack, which may communicate through interfaces implemented via communicative means (such as an application interface API or message passing system). As part of networking applications 230, physical layer interface 405 provides interfacing between network interface units 220 and other networking applications 230 (for example, formatting data packets according to the requirements of the particular physical transmission medium). Internet protocol IP module 410 is coupled to the physical layer interface 405 and provides facilities for receiving and transmitting data packets according to the IP protocol.

Above the IP protocol module 410 may be one or more additional applications, such as transmission control protocol (TCP) module 415, universal datagram protocol (UDP) module 420 and OSPF module 425, each of which is coupled to IP module 410 in order to transmit and receive data packets in the IP format.

Figure 5:
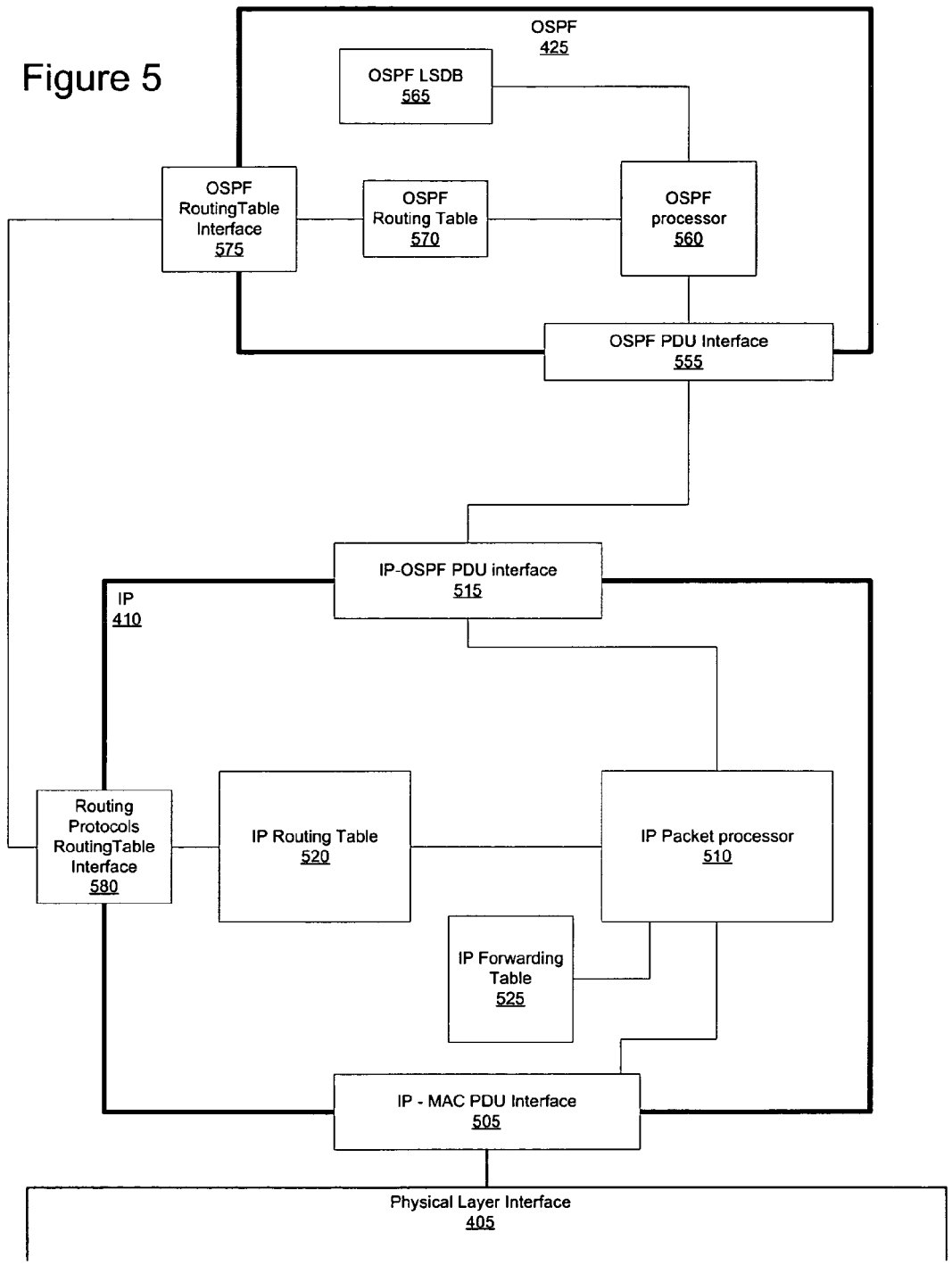
FIG. 5 is a block diagram of exemplary IP and OSPF network components, according to the present invention.

FIG. 5 shows a block diagram illustrating in further detail IP protocol module 410 and OSPF module 425. IP protocol module 410 includes a packet interface to the data connection/physical layer interface 405, IP-MAC PDU Interface 505, through which packets (also referred to as protocol data units or "PDUs") are exchanged between IP protocol 410 and physical layer interface 405. IP protocol module 410 also contains an IP Packet Processor 510, which processes data packets, and a packet interface to the OSPF protocol, IP-OSPF PDU Interface 515, through which OSPF packets are exchanged between OSPF protocol 425 and IP protocol 410. IP protocol module 410 may also include IP Routing Table 520 for storage of packet routing information. Packet routing information may be obtained from static configuration, or dynamically from routing protocols such as OSPF, through the Routing Protocols Routing Table Interface 580. IP protocol module 410 chooses the best overall routes from IP Routing Table 520 and stores them in the IP Forwarding Table 525, which the IP Packet Processor 510 uses for forwarding packets received from one network interface to another network interface one hop closer to their destination. Alternatively, the routing table may be located outside the IP protocol module, and a communication method may then be provided to access the contents of the routing table.

OSPF module 425 includes a packet interface to the IP protocol module, the OSPF-PDU Interface 555, through which OSPF packets are exchanged with IP module 410; an OSPF Processor 560, which contains tasks that process OSPF packets according to the OSPF protocol; the OSPF Link State Database 565, which stores link state information according to the OSPF protocol; and the OSPF Routing Table 570, which contains routes computed by applying the SPF algorithm computation to the link state database. Routes stored in OSPF routing table 570 are reported to IP routing table 520 through OSPF Routing Table Interface 575 and Routing Protocols Routing Table Interface 580.

As described earlier, IPv6 addressing uses a 128-bit (16-byte) address size, which is 12 bytes larger than the IPv4 address size (4 bytes). This increase in address size has a significant effect on the amount of storage required for routing operations. For example, each routing table entry includes at least one IP address (the destination IP address), and therefore each routing table entry will be at least 12 bytes larger for IPv6 routing than for IPv4 routing. For large routing tables, this increase will significantly impact storage resources and processing time. According to the preferred embodiment of the present invention, IP addresses stored in the routing device may be stored in compressed format that reduces storage space without overall degradation in processing speed, and with better processing speed in most cases.

Figure 6:
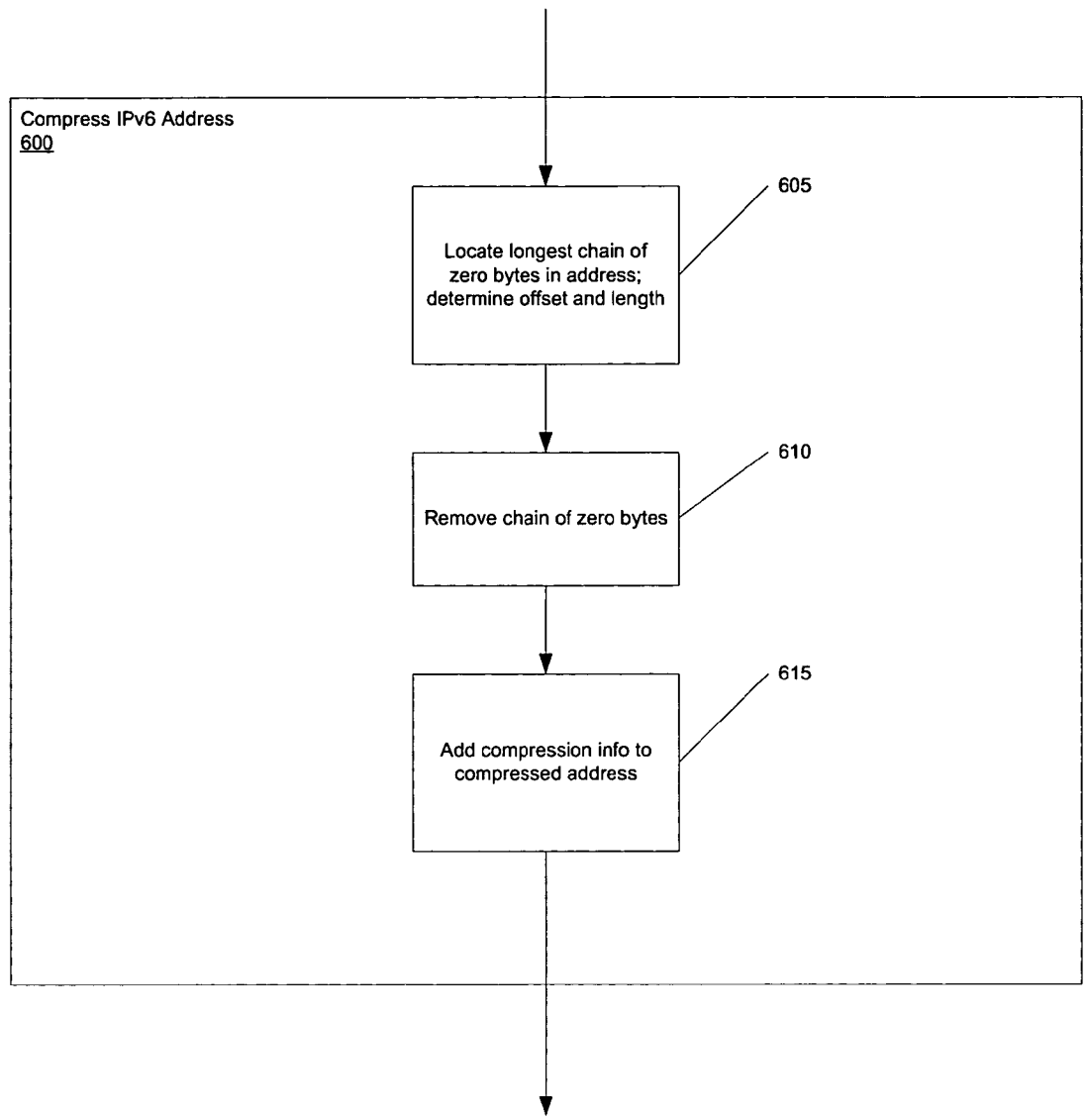
FIG. 6 is a flow chart of an exemplary IPv6 compression method, according to the present invention.
Figure 7:
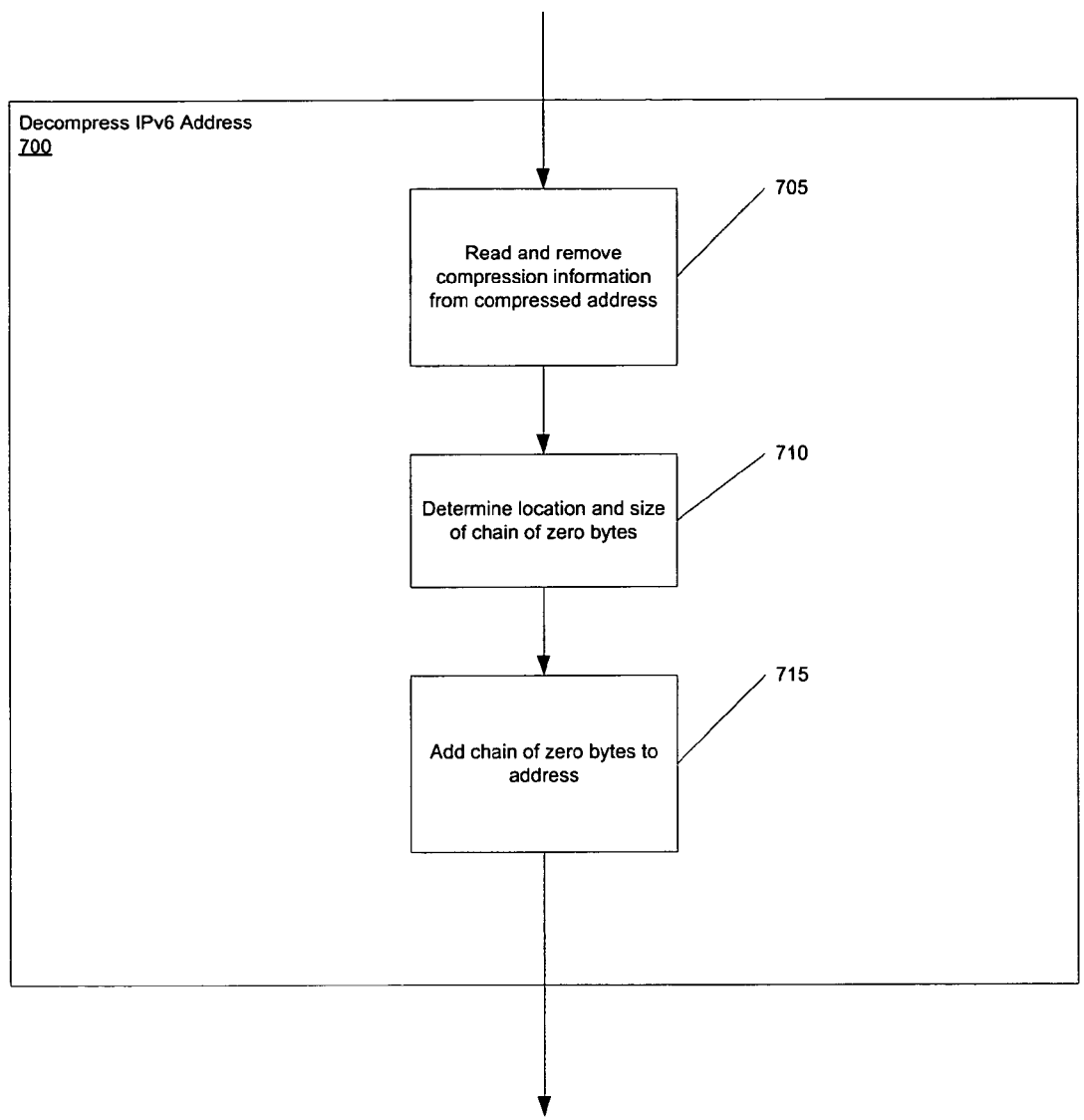
FIG. 7 is a flow chart of an exemplary IPv6 decompression method, according to the present invention.
Figure 8A:
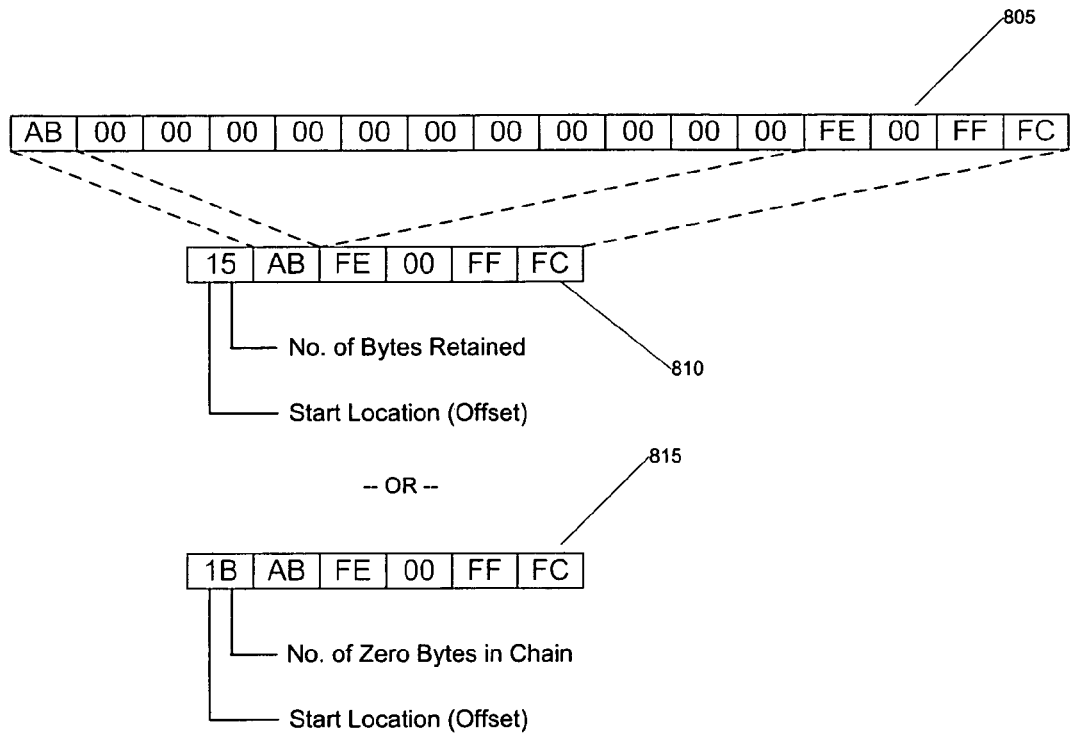
FIGS. 8(a) and 8(b) are examples of the application of the exemplary compression method of FIG. 6, according to the present invention.
Figure 8B:
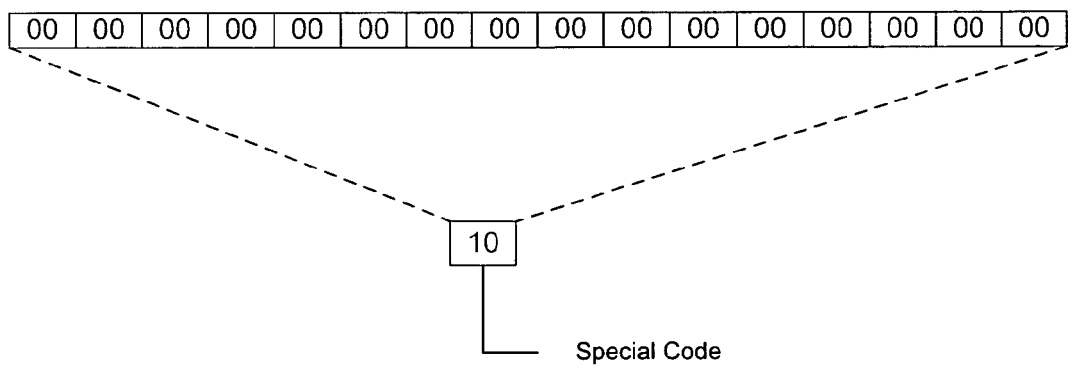

FIGS. 6, 7 and 8 illustrate the preferred compression format and methods related thereto. FIG. 6 shows a flow chart of a preferred method to compress IPv6 addresses according to the preferred compression format. The longest contiguous grouping of zero bytes in an uncompressed IPv6 address is identified (step 605), and compression information is generated for the IPv6 address. The compression information will be that information needed in order to reconstruct the original (uncompressed) address, and in the preferred format is the location of zero byte grouping (chain) and its length. The location may be specified as an offset from the beginning of the IPv6 address (for example, an offset of two would indicate that the chain of contiguous zero bytes starts after the second byte of the IPv6 address). The chain of zero bytes identified is then removed, leaving a group of remaining bytes from the uncompressed IPv6 address (step 610). A compressed IPv6 address is then formed by adding the compression information to the remaining bytes (step 615). In the preferred format, this compression information is stored as a compression information byte that is added in front of the remaining bytes, with the offset preferably stored in the upper four bits of the byte and the length stored in the lower four bits of the byte.

FIGS. 8(*a*) and 8(*b*) illustrate an example of the method described above. In FIG. 8(*a*), uncompressed IPv6 address 805 is a 16-byte value with a contiguous group of eleven zero bytes starting at the second byte of the address. Applying the method of FIG. 6 to this example, compression information is generated (offset=1, length=11), and the chain of eleven zero bytes is removed, leaving five original bytes remaining. A compression information byte is then added to these five retained bytes to generate a compressed IPv6 address 810. The compression information byte contains the compression information, with the offset information in the most significant bits and length information in the least significant bits. For compressed IPv6 address 810, this compression information is the offset at which the zero bytes began (in this example, after byte one), and the number of bytes retained from the original address (in this example, five bytes). Alternatively, a compressed IPv6 address 815 may be generated where the compression information is the offset at which the chain of zero bytes starts and the number of zero bytes in the chain (in this case, eleven bytes).

One special situation is the case of the "null" address—an IPv6 address with all sixteen bytes being zero. The compression information for this address would be an offset of zero and a length of sixteen. Using the preferred compression format, this compression information may not fit into the compression information byte (because representing a length of sixteen would require more than four bits). To deal with this special situation, when a null address is detected, a special compression information byte may be used that is unique and otherwise would not be generated according to the normal compression method. This situation is illustrated by FIG. 8(*b*), where a null IPv6 address is compressed into a compressed IPv6 address of a single byte—the compression information byte of hex "10".

FIG. 7 is a flow chart of the preferred decompression method. The compression information is read from the compressed IPv6 address (step 705). According to the preferred format, the compression information is stored in the compression information byte at the start of the compressed IPv6 address as offset and length information. The compression information may be removed and processed (for example, using a bit mask or shifting operation) to determine the size and location of the chain of zero bytes needed to reconstruct the original IPv6 address (step 710), and to determine if a special compression information byte is present (e.g., the null address byte). A chain of zero bytes of the length calculated from the compression information may then be added to the remaining bytes of the compressed IPv6 address at the location specified by the offset value, thus creating an uncompressed IPv6 address equal to its original value (step 715).

The preferred compression format and methods are extremely useful in compressing/decompressing IPv6 addresses, which typically include significant numbers of zero bytes. For example, an IPv6 address corresponding to a IPv4 address will include twelve bytes of zero followed by the four IPv4 address bytes (see, for example, network N1 in FIG. 3). In such a case, the preferred compression format will yield a compressed IPv6 address with a length of five bytes—eleven bytes smaller than the original IPv6 address. Thus significant storage savings may be achieved by using the preferred compression format.

Figure 15:
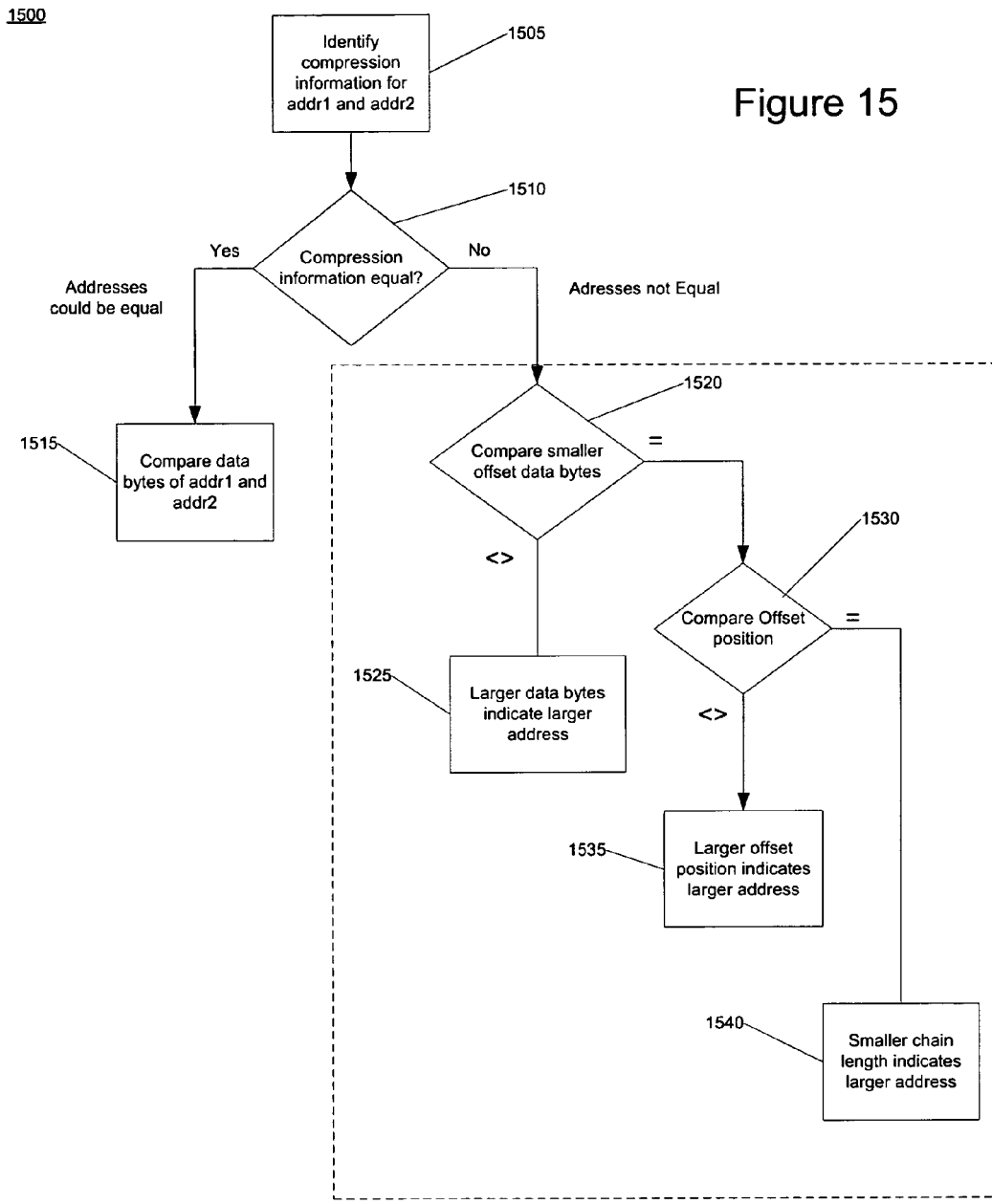
FIG. 15 is a flow chart of an exemplary method for comparing compressed addresses to compressed addresses, according to the present invention.

Another benefit of the preferred compression format and method is that compressed IPv6 addresses may be easily compared without the need for decompression. FIG. 15 is a flow chart that illustrates the comparison of two compressed IPv6 addresses. For each address, its compression information is identified (step 1505). If the compression information of each address is equal (step 1510), the two addresses may be equal, and the remaining data bytes of the two compressed addresses may be directly compared (step 1515) to determine if they are equal (or which address is larger if that is desired). FIG. 16(*a*) illustrates an example. Address1 has a compression information byte of "16" (Offset=1, Length=6) with six retained data bytes, as does Address2. Since the compression information bytes of each address are equal, the six retained data bytes of each address may be compared to determine if they are equal (or which address is larger, if desired). The fact that the compression information bytes of each compressed address are the same indicates that the same chain of zero bytes is present at the same location in each address and therefore their removal will not change the comparison results—and may in fact reduce the amount of time needed to perform comparison compared to the uncompressed case, since the zero bytes are not compared (thereby reducing the number of comparison instructions executed).

If the compression information bytes are not equal in FIG. 15, step 1510, then the two compressed addresses are not equal. If this is all the information that is needed, then the process may end (for example, by passing a result code indicating the addresses are not equal). However, if the relative order of the addresses is desired, the remaining bytes of each address are compared, initially up to the byte location of the smaller offset of the two addresses (step 1520). If these respective bytes are not equal in each compressed address, the address with the larger respective data bytes is the larger/higher address (step 1525). If these respective bytes are equal, then the offsets may be compared (step 1530). If the offsets are not equal, then the address having the larger offset is the larger/higher address (step 1535). If these respective offsets are also equal in each compressed address, then the address with the smaller zero byte chain length (i.e., the larger compressed length) is the larger/higher address (step 1540). Although this comparison process requires additional steps, in typical cases its performance is at least equivalent to the performance of uncompressed comparisons, since comparison of the long zero byte chain is avoided.

Figure 14:
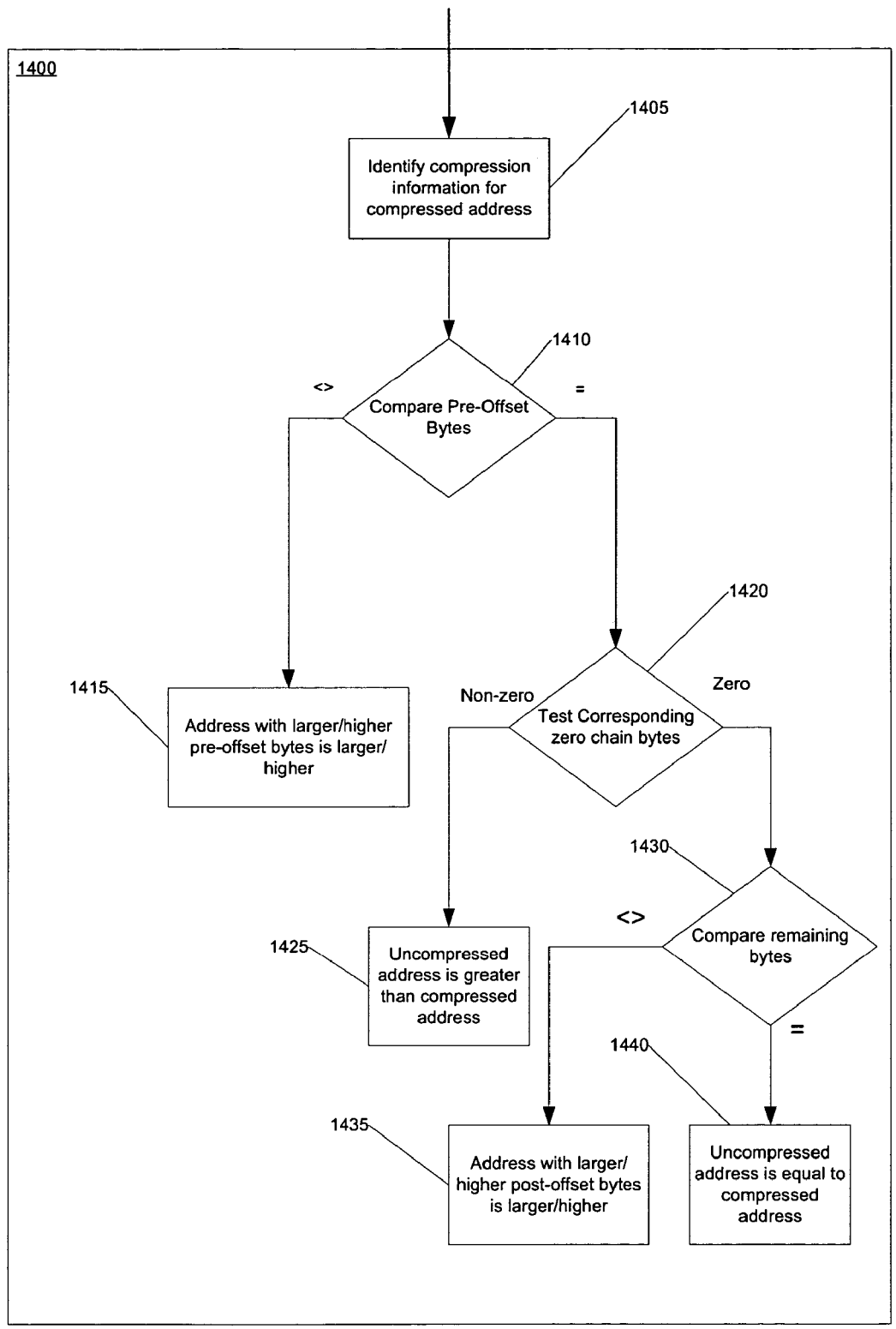
FIG. 14 is a flow chart of an exemplary comparison method for comparing uncompressed addresses to compressed addresses, according to the present invention.

FIG. 14 is a flow chart illustrating a preferred method for comparing an uncompressed IPv6 address to a compressed IPv6 addresses (without the additional step of decompressing the compressed IPv6 address). The compression information of the compressed address is identified (step 1405), and the "pre-offset" data bytes of the compressed address (i.e., those data bytes that would come before the chain of zero bytes that have been removed from the compressed address) are compared to the corresponding bytes of the uncompressed address (step 1410). If these bytes are unequal, then the larger/higher address is the address with the larger/higher compared bytes (step 1415). If these bytes are equal, then the bytes of the uncompressed address corresponding to the chain of zero bytes in the uncompressed address are tested for zero (step 1420). If they are not zero, then the uncompressed address is larger than the compressed address (step 1425). If they are zero, the remaining "post-offset" bytes of the compressed address are compared to the corresponding bytes of the uncompressed address (step 1430). If these bytes are equal, the addresses are equal (step 1440), otherwise the larger/higher byes indicate the larger/higher address (step 1435). In this case the number of bytes actually compared is the same due to the fact that no assumption can be made about the uncompressed address—even if it contains a long chain of zeros, that information is not known in advance, and therefore cannot be used to increase the comparison speed.

FIG. 16(*b*) illustrates an example of the comparison described below for comparing an uncompressed IPv6 address to a compressed IPv6 address. Address3 is uncompressed, while Address4 is compressed (offset=1, compressed length=6, includes a chain of 10 zero bytes starting after first byte). Comparison of the "pre-offset" bytes shows they are equal ("AB"). However, testing of the bytes in the uncompressed address corresponding to the zero byte chain indicates the presence of a non-zero byte ("AC"), which indicates that the uncompressed address Address3 is larger than Address4.

Comparisons of IPv6 subnets can proceed as described above for IPv6 addresses, except that each comparison further includes application of the applicable subnet mask byte. For example, prior to comparing each pair of bytes, a logical "AND" operation is executed on the address bytes and the corresponding mask byte. The comparison may stop early, at the first byte where the corresponding mask byte is null, as null mask bits indicate bits of the addresses that can be ignored. As IPv6 masks are specified by a mask length which gives the number of non-null bits from the most significant bit of the address (followed by only null bits), the mask length may be extracted from the routing table entry and the mask byte corresponding to the particular address bytes being compared may be either computed each time using bit shift operations or stored for speed in a constant mask byte array indexed by mask length for the 128 possible mask lengths.

FIG. 16(*c*) illustrates an example of comparing an uncompressed IPv6 address ("Address5") having a subnet mask (120) with a compressed IPv6 address ("Address6") also having a subnet mask (96). According to the methods outlined above, the bytes "pre-offset" are first compared. As part of this comparison, the portions of the subnet mask corresponding to each address byte are applied prior to comparison, in this case by ANDing the appropriate mask bits prior to comparison. The mask bits themselves may be tested for zero, indicating that the remainder of the address is to be ignored. In the example of FIG. 16(*c*), Address5 and Address6 have equal pre-offset bytes and bytes within Address6's chain of zero bytes. Address5 and Address6 have unequal bytes at byte location thirteen, with this location having a smaller value for address5(0x35) than for Address6(0x7E). This byte location is outside of the subnet mask for Address6(mask length 96=bytes 1-12), but it is not outside of the subnet mask for Address5(mask length 120, bytes 1-15). As a result, the byte is nulled by the AND operation with the mask for Address6 while it is not nulled for Address5. Comparison of byte location thirteen of the two addresses would compare 0x35 for Address5 with 0x00 for Address6, and therefore subnet Address5/120 would be found to be bigger than subnet Address6/96, and the addresses would be considered equal. This situation typically occurs when adding a new routing table entry for a subnet: compare with subnets already in the routing table to find if the new subnet is already present in the routing table or if it is included in a less specific subnet already existing in the routing table.

FIG. 16(*d*) adapts the example of FIG. 16(*c*) to comparing an uncompressed IPv6 address (without any mask) to a subnet. This comparison typically occurs during forwarding: search for destination IPv6 address of a packet in the IPv6 routing table by comparing an IPv6 address to the subnets or IPv6 addresses defined in the routing table. As shown in FIG. 16(*d*), when comparing Address7 to Address8(in this case, a subnet in current routing table entry) the same mask from the routing table entry is applied to both the address to search for (Address7) and the address in the routing table (Address8) during comparison of address bytes. For FIG. 16(*d*), Address7 and Address8 will be compared and result in an indication that Address7 is "equal" to Address8(as all bytes in each address within the mask for Address8 are equal). The algorithm in FIG. 14 may be considered completed when all bytes corresponding to non-null mask bytes have been compared; the maximum number of bytes to be compared would actually be the number of non-null mask bytes. Steps 1410, 1420 are performed and at step 1430 of FIG. 14, once there are no more bytes to compare, comparison can stop and declare comparison completed with result equal (or "uncompressed address included in compressed subnet" for subnet comparisons).

Figure 9:
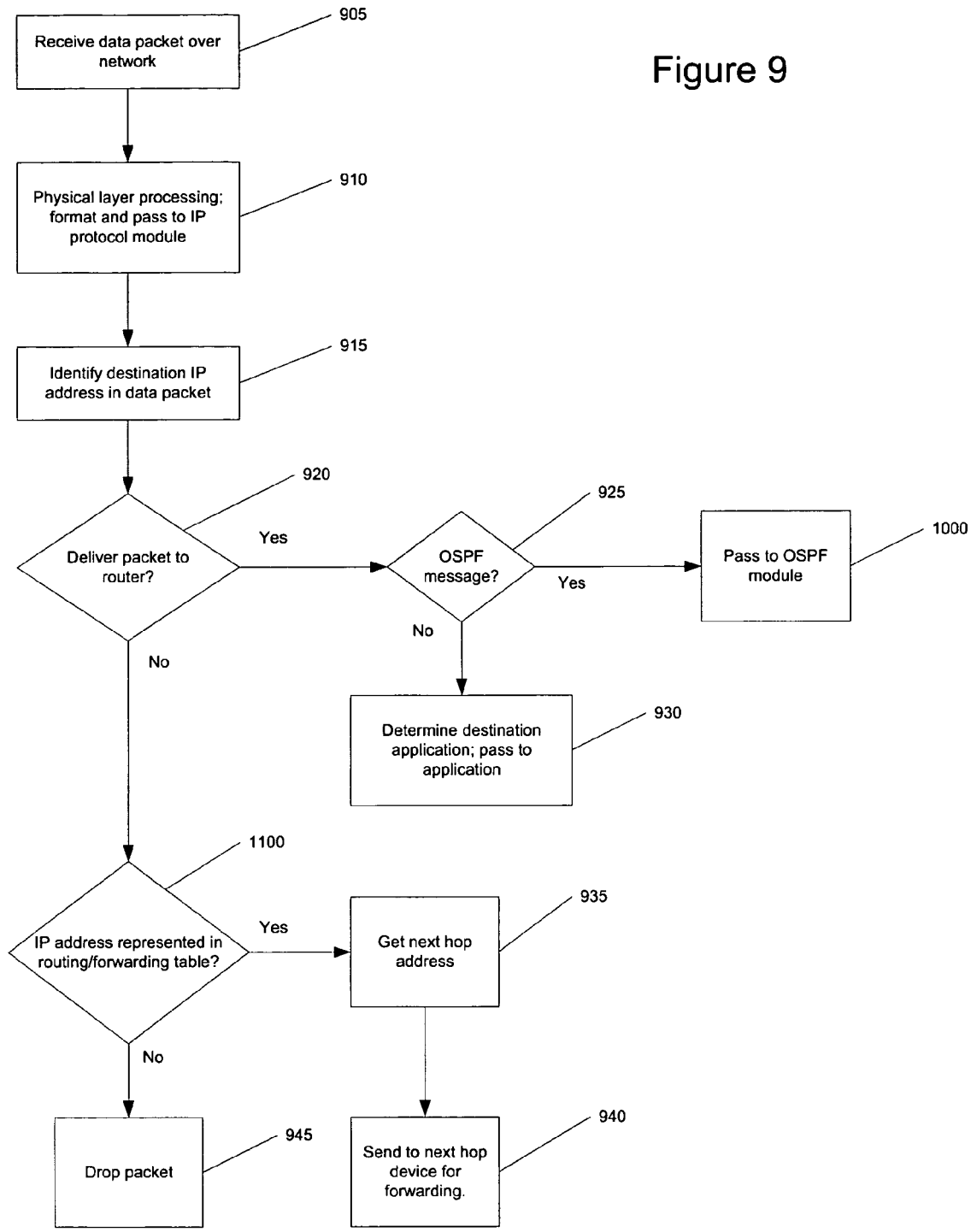
FIG. 9 is a flow chart of an exemplary method of processing incoming IP data packets, according to the present invention.

The beneficial qualities of the compression format and methods described above may be applied, for example, to the routing of IP data packets by a routing device. FIG. 9 shows an exemplary flow chart of the operation of the exemplary system implementing the preferred compressing format and methods, according to the present invention. Those of skill in the art will recognize that the packet processing example shown in FIG. 9 and described hereafter omits various details related to the processing of IP data packets, which are otherwise unnecessary for description of the implementation of the preferred embodiments of the present invention and are omitted for clarity purposes. An IP-formatted data packet is received by router 200 via network interface system 220 and physical layer interface 405 (step 905). Physical layer interface 405 removes any special formatting used during transmission over the particular physical medium in use, such as media access control layer encapsulation of the data packet (for example, Ethernet network data includes Ethernet MAC address, header and trailer information in transmitted data). Physical layer interface 405 then determines whether the data packet is an IP-formatted data packet (for example, based on the header information provided in the data packet), and passes the data packet to IP protocol module 410 (step 910). The IP protocol module examines the IP header of the data packet and determines the destination IP address of the data packet (step 915). If the data packet is addressed such that it should be delivered to the router 200 (e.g., it has as its destination IP address the IP address of the router), the data packet is passed to one of the higher level protocol modules provided in the networking applications (step 920), depending on the information stored in the data packet. For example, if it is determined that the data packet is formatted as an OSPF message (step 925), the data packet is passed to OSPF module 425 for processing (step 1000). Otherwise, the data packet may be passed to other modules within the stack (step 930).

If the data packet is not to be delivered to the router 200, a routing process is performed to determine what to do with the data packet. The IP forwarding table is searched for an entry that most closely matches the destination IP address of the data packet (step 1100). If an entry is not found for the destination IP address, the data packet may be dropped and/or other error handling processes (like statistics collection) may be launched (step 945). If an entry is found in the forwarding table, the identity of the routing device which should next receive the data packet (the "next hop router") is retrieved from the forwarding table (step 935), and the data packet is forwarded (according to well known processes) to the next hop router (step 940) for transmission to its ultimate destination.

As mentioned previously, one of the common systems for providing routing information between routing devices in an IP network is through the use of the standard routing protocol OSPF. As part of the OSPF protocol, each router receives OSPF messages from other routers to which it is connected. These messages are used to distribute network connectivity information between adjacent routers up to the point where all routers in an area have synchronized their knowledge about the IP addresses they can reach. The OSPF specific packets that describe links are called "link state update" (LSU) packets, which contain multiple descriptions of links in the format of "link state advertisements", or LSAs—indicating those IP addresses to which they can provide routes, as well as "cost" information for using those routes and other information about the link, such as link type and list of devices connected to that link. LSAs are used in OSPF protocol to generate a link state database that stores link state information. OSPF then applies a shortest path first algorithm computation to the link state database to generate the routing table used for routing by the IP routing facilities. According to the exemplary embodiment of the present invention, the IPv6 addresses that are received as part of LSAs may be compressed prior to entry into the link state database, thus reducing the overall size of the link state database. Also IPv6 addresses to be included in any routing table (such as OSPF Routing Table 570 and the IP Routing Table (520) may also be compressed using the same compression algorithm prior to recording them, thus reducing the overall size of the routing table. Old and new routing table entries can be compared by comparing addresses in compressed format without decompression, with faster comparison due to fewer bytes to compare. When the router 200 processes a received data packet, the routing table lookup to determine route path can be done by directly comparing the uncompressed IPv6 destination address contained in the packet with IPv6 compressed addresses in the routing table, without a drop of performance of the lookup operation.

Figure 10:
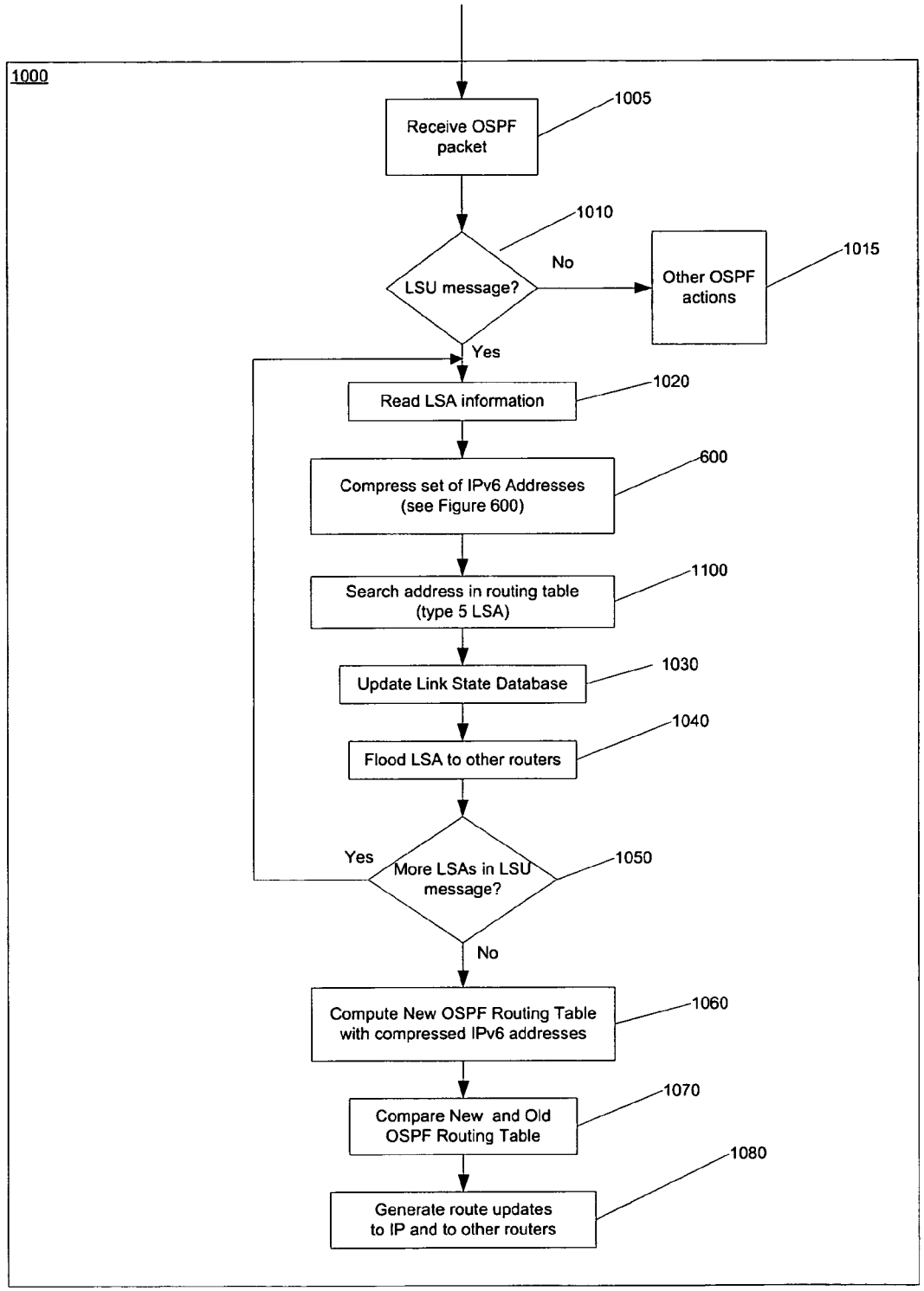
FIG. 10 is a flow chart of an exemplary OSPF packet processing method, according to the present invention.

FIG. 10 illustrates a flow chart of actions to be performed upon the identification that a data packet received by router 200 is an OSPF message (following from step 1000 of FIG. 9). The data packet is received by the OSPF module 425, through the OSPF PDU interface 555 (step 1005). It is then determined whether the data packet is a link state update (LSU) message (step 1010), or a different type of OSPF message. If the data packet is another type of OSPF message, the data packet is processed accordingly (step 1015). If, however, the data packet is an LSU message, every LSA in the LSU is examined and processed. For each LSA in the LSU message, the link state information stored in the message is read (step 1020). This link state information will take the form specified by the OSPF protocol and may include an IPv6 address, a cost value, an identification of the advertising router and other information—for example if the LSA describes a router, it includes a list of local IPv6 addresses, and also types and identities of all networks connected to that router, but if the LSA describes a network, it may include a list of all IPv6 addresses associated with that link and may include identities of all routers connected to that network. The IPv6 addresses in the link state information may be compressed (step 600) according to the preferred compression format and method (for example as illustrated in FIG. 6). For some types of LSAs, the IPv6 addresses may be searched in the OSPF routing table 570 (step 1100 of FIG. 10). For example, this search needs to happen for type 5 LSAs, which contain routing information obtained by OSPF via redistribution from other routing domains or from static configuration. The Internet is partitioned in autonomous system domains, each of which runs one routing protocol to compute routes within the autonomous system. At the boundary between such domains, the routers connected to more than one domain (in OSPF called "autonomous system boundary router", or "ASBR"), import condensed routing information from other routing domains. In OSPF, such imported routes are propagated through the OSPF domain via type 5 LSAs. For example if the adjacent routing domain runs RIP, OSPF would import RIP routes and propagate them through type 5 OSPF LSAs. These will be searched in the OSPF routing table to find out if there is not already a better route to same destination, from another source or through an internal OSPF route, which would be always preferred over external routes.

The link state database 565 may then be updated using the link state information (step 1030), and the LSA may be flooded (step 1040) to other routers to distribute knowledge about that link throughout the area or whole routing domain. If there are more LSAs in the LSU message (step 1050) the next LSA is processed. Otherwise, a new OSPF routing table may be computed (1060) depending on link changes and time since the last computation, and the new routing table is compared with the old OSPF routing table (1070) to detect changes. As both routing table instances will use compressed addresses, the comparisons may be performed using the compressed-address-to-compressed-address comparison method illustrated by FIG. 15 to compare the compressed addresses in the old routing table with the compressed addresses in the new routing table. As result of comparison between old and new OSPF routing tables at step 1070, the IP routing table 520 may then be updated based on the new OSPF routing table information (step 1080).

Figure 12:
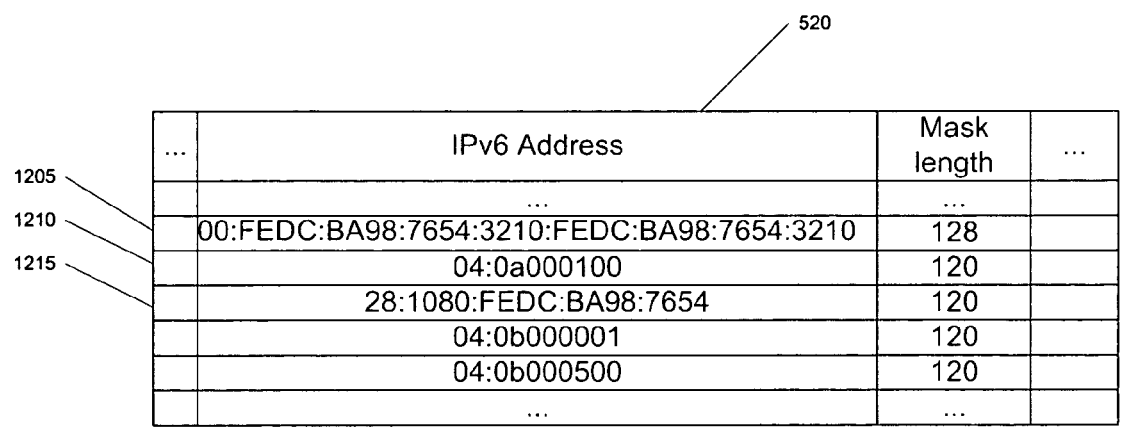
FIG. 12 is an exemplary IPv6 routing table containing compressed IPv6 addresses, according to the present invention.

FIG. 12 shows an example of an IP routing table 520 that includes entries with compressed IPv6 addresses. The address values in FIG. 12 are displayed in "internal" format—the compressed address bytes. Display of the routing table from a user interface would preferably show the IPv6 addresses in the table in string format according to RFC 2373. IP routing table 520 may include other fields and additional entries; the example of FIG. 12 merely illustrates the implementation of the preferred embodiment within such a table. Entry 1205 indicates an IPv6 address that was uncompressible—no chain of zero bytes (this is a rare case). This address can be stored in the IP routing table 520 as an uncompressed address, with its associated mask length (in this case 128 bits long, therefore it is not a subnet) and according to the preferred format, by prepending it with a null compression info byte. Alternatively the entry can be stored without a null compression info byte by indicating via a routing table entry flag that this is uncompressed address. Entry 1210 is a compressed address having a chain of zero bytes starting at offset zero (the beginning of the address) and containing twelve zero bytes (corresponding to the four byte length of the compressed address excluding the compression info byte). The uncompressed IPv6 address corresponding to the compressed address in entry 1210 could thus be written as "0000:0000:0000:0000:0000:0000:0A00:0100" or alternatively "::0A00:0100". Entry 1215 also contains a compressed address, having a chain of zero bytes starting at offset two and having a length of eight. The uncompressed IPv6 address corresponding to the compressed address in Entry 1215 could thus be written as "1080:0000:0000:0000:0000:FEDC:BA98:7654" or alternatively "1080::FEDC:BA98:7654".

In alternative embodiments, the OSPF protocol may be replaced by other processes for establishing routing information for an IP network (e.g., RIP). In any case, the benefits of the present invention (for example, as implemented in the compression format and methods described above) would also apply, as in any routing information process there would need to be the exchange and storage of IPv6 addresses to specify routes.

Figure 11:
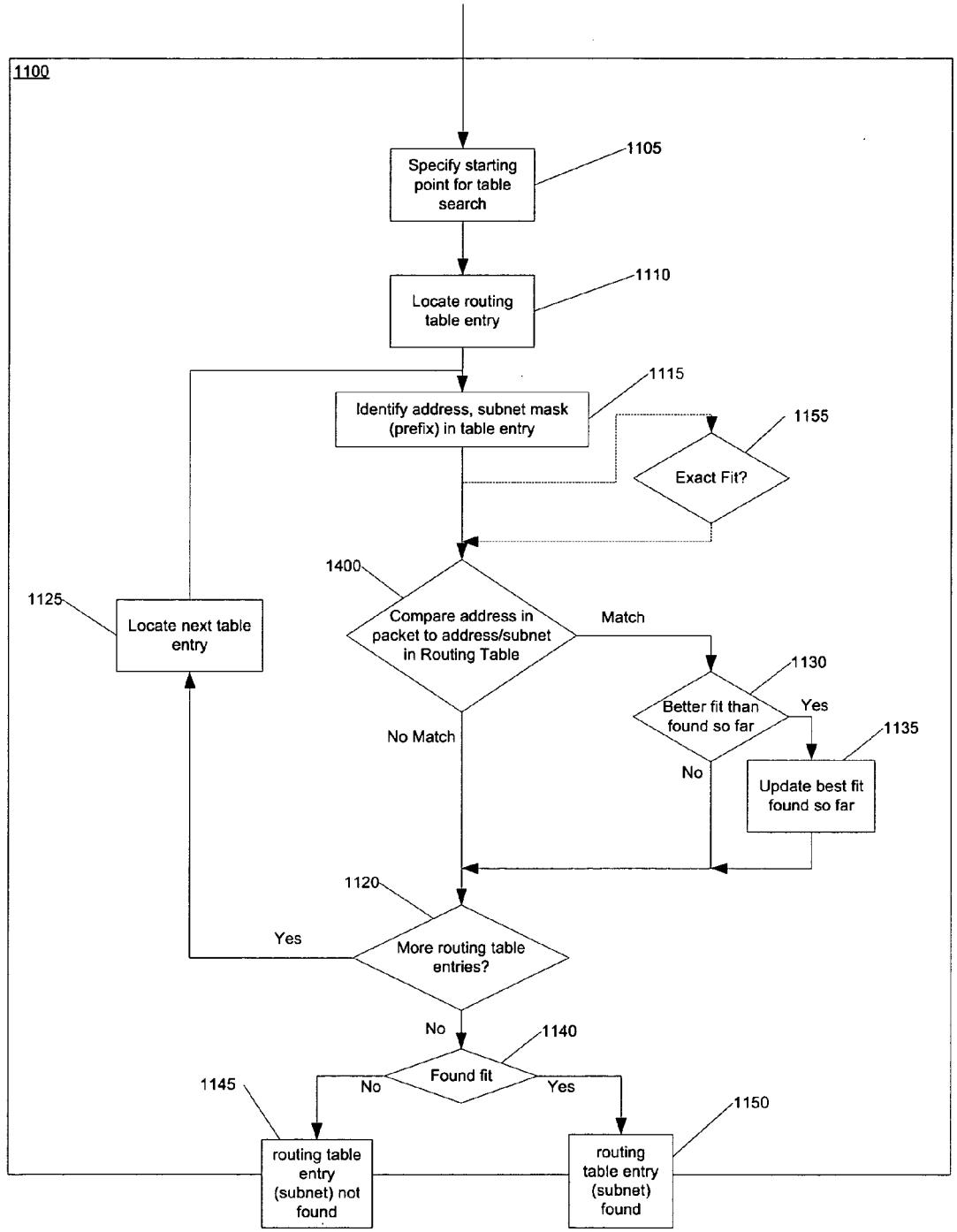
FIG. 11 is a flow chart of an exemplary routing table search, according to the present invention.

FIG. 11 illustrates a flow chart of the operation of the routing table comparison (step 1100) of FIG. 9. A starting point for the search will be specified (step 1105), and the entry in the routing table corresponding to the starting point will be located (step 1110). The destination IP address stored in the routing table entry is identified, as well as its subnet mask length (step 1115) and compared to the destination IP address in the received data packet by applying the uncompressed-address-to-compressed-address comparison method (step 1400) illustrated in FIG. 14. If no match is found then the search proceeds to the next routing table entry, if any (step 1120), and the results of the comparison may be used to adjust the search properly (e.g., if the address in the received IP data packet is larger than the address in the routing table entry being analyzed, the search may be adjusted towards entries having lower IP addresses, if the routing table is sorted by IP address). If a match is found, it is then determined if the match is the "best match" found so far (step 1130). A match is a better match if the subnet mask is longer (called a "more specific mask" thereby specifying a more precise set of network locations). For example, a routing table entry with an IP address of ::C4F1:7F11/120 is a better match than a routing table entry with an IP address of ::C4F1:7F01/112. This step can compare the subnet just found with the best subnet found so far by applying the preferred algorithm of comparison of compressed IPv6 addresses without decompression (see FIG. 15). If the routing table entry is the best match found so far, it is recorded (step 1135). In any case, the routing table search continues until completed. When no more routing table entries need to be searched in the routing table, it is verified if a best routing table entry was found at step 1140. If not found, the algorithm returns routing table entry not found at step 1145, otherwise it returns best entry found (step 1150) that will be used by IP for forwarding.

Alternatively, the IP protocol module may be searching for an "exact fit" to the specified address in the routing table—all bits of the specified address and the routing table entry address matching regardless of subnet mask length. If exact fit matching is specified by the IP processor (step 1155), the comparison process may be performed without using subnet masks, thus forcing exact matching of addresses.

The preferred compression format and methods described above not only provide for reduced storage requirements (which may be useful in reducing component costs and retrofitting existing hardware for use in IPv6 enabled networks), but also typically yield performance improvements in packet forwarding. To illustrate, compare the situations of comparing two addresses A1 and A2 in the first case where A1 and A2 are uncompressed, then in the case where A1 and A2 are compressed with offsets O1 and O2 and compressed lengths L1 and L2, respectively. In the uncompressed case, the processing time is the number of bytes that must be compared before determining whether A1 is not equal to A2. This can be done, for example, by comparing the most significant bytes in order until an unmatched pair is found. This number of search bytes can be denoted $N_{uncompressed}$, which can fall from 1 to 16. In the compressed case, there are three possible results. First if the compression information is equal (same offsets O1=O2, same lengths L1=L2), then the maximum number of search bytes is $N_{compressed}$=1+L1 (the compression information byte plus the number of retained bytes, which may be compared in order), and in many common situations $N_{compressed}$ will be significantly smaller than $N_{uncompressed}$ because the sequence of L1 null bytes do not need to be compared at all (for example, for IPv4 addresses formatted as IPv6 address which are most of the IPv6 addresses in use today, a 68% reduction in number of bytes compared may be achieved).

FIGS. 13(a) and 13(b) illustrate examples of the processing savings. As shown in FIG. 13(a), for the case of both addresses being uncompressed, fifteen bytes must be compared before determining that A1 is smaller than A2. For the case of both A1 and A2 being compressed, only 4 bytes need to be compared: the compression byte, the first two bytes "pre-offset" and the first byte after the null area are compared instead of first fifteen bytes that would be compared for the uncompressed case. FIG. 13(b) shows an example of comparing two IPv6 formatted IPv4 addresses, which will have the same offset and same length values (since each starts with twelve zero bytes). As shown in FIG. 13(b), for the comparison of uncompressed addresses, at least the first thirteen bytes would need to be compared (and at most 16 bytes), whereas for the comparison of the same addresses in compressed form, the compression could be done in as few as two bytes (and at most five bytes). For this particular example, the performance gain is thirteen bytes-two bytes=eleven bytes out of thirteen bytes, or 85% faster. In fact, in the case of IPv4 compatible IPv6 addresses (which is the majority of addresses in use currently) compressed address comparison is always eleven bytes shorter from the at most sixteen bytes to be compared, for at least a 68% faster comparison speed.

For the second situation where the offsets are different (O1< >O2), $N_{compressed}$ will equal $N_{uncompressed}$, since each method will compare at most the "pre-offset" bytes of the shortest offset plus one additional byte (for the compressed address it is the first null byte after the shortest offset, for the uncompressed address it is the additional unmatched byte).

Finally, for the third situation where the offsets are the same (O1=O2) but the lengths are different (L1< >L2), then the maximum number of search bytes is $N_{compressed}$=1+O1, which may be significantly smaller than $N_{uncompressed}$ (which will require comparison of the "pre-offset" bytes plus comparison of the common null bytes in both addresses and one additional byte to indicate the result). FIG. 13(c) illustrates and example of this situation, where A1 has a compression byte of "24" and A2 has a compression byte of "25." In this example, comparison of the uncompressed addresses requires comparison of 14 bytes. Comparison of the compressed addresses, however, requires comparison of only 3 bytes (the compression byte and the two "pre-offset" bytes).

Figure 16A:
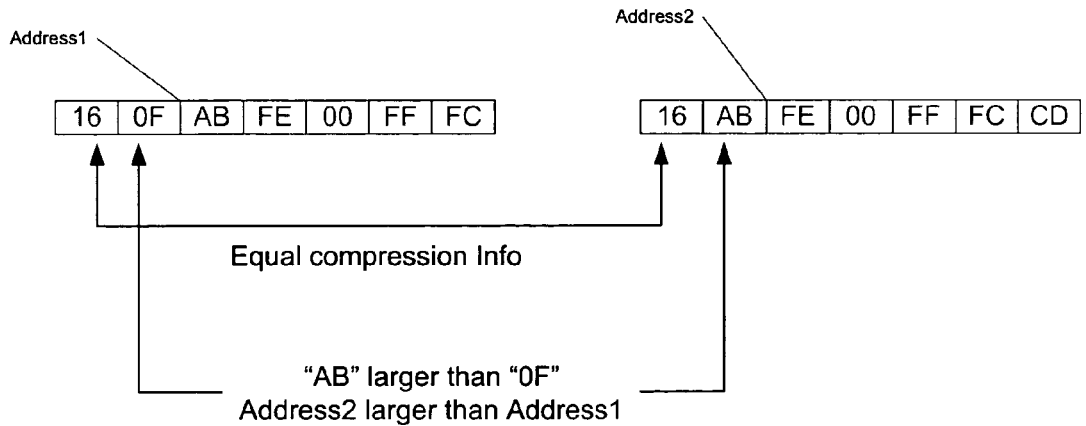
FIGS. 16(a), 16(b), 16(c) and 16(d) are examples of comparisons of compressed addresses with compressed and uncompressed addresses according to the present invention.
Figure 16B:
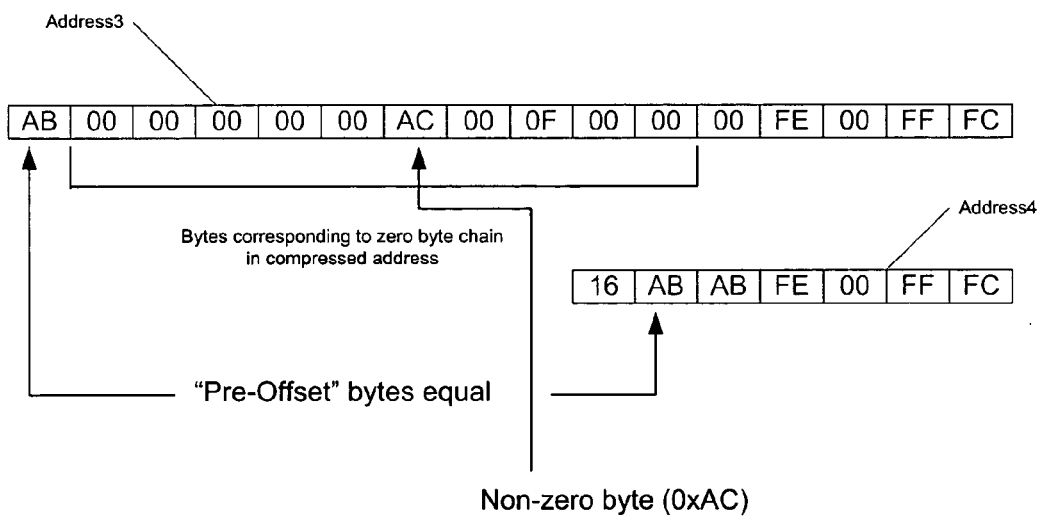
Figure 16C:
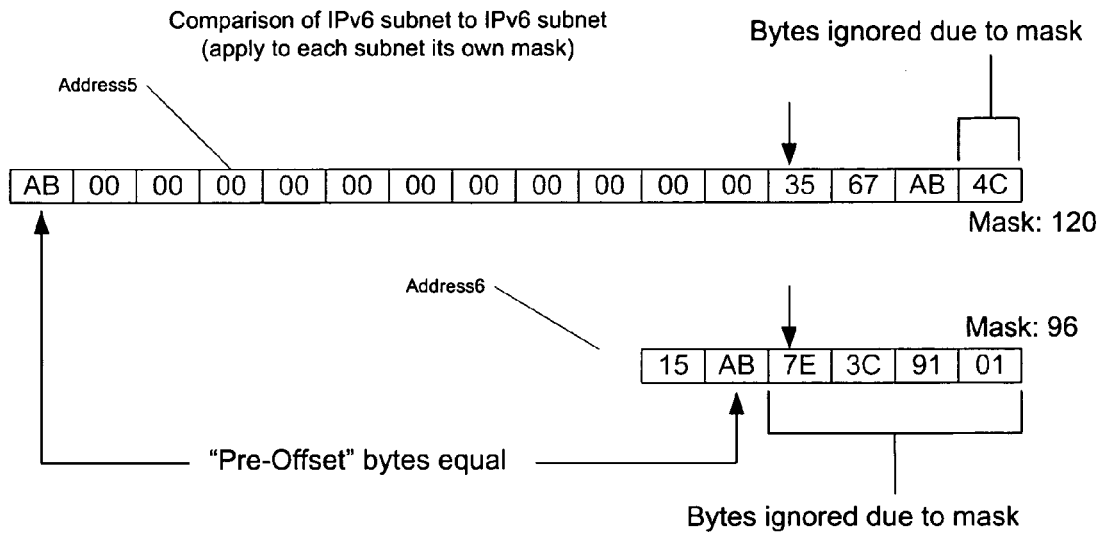
Figure 16D:
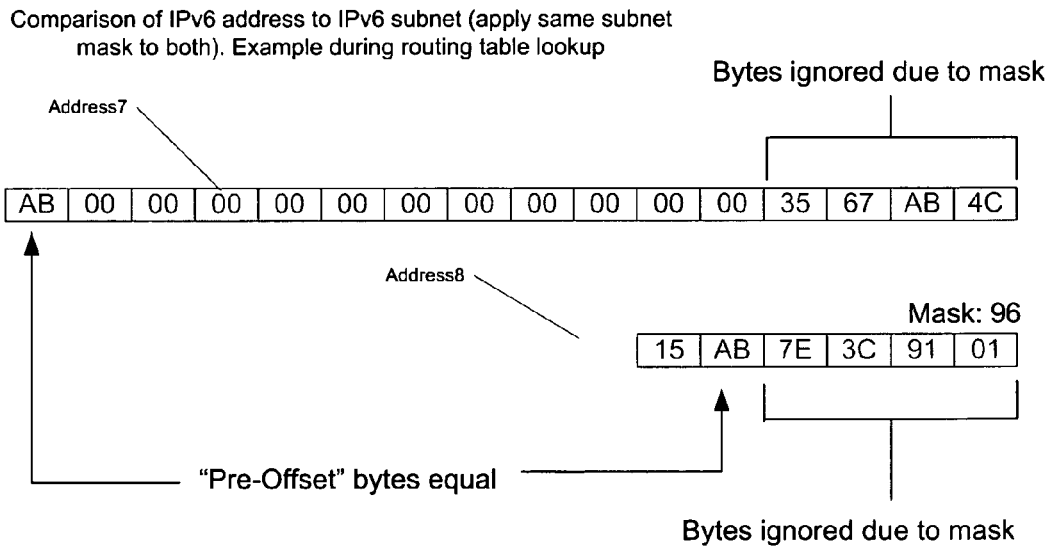

As discussed above, the comparison process in all cases results in at worst the same number of comparisons as the uncompressed case, and in many cases achieves faster performance than the comparison of the same addresses in uncompressed format. Similar analysis in the case of the comparison of an uncompressed address to a compressed address indicates that the processing time is comparable to that of the case of the comparison of two uncompressed addresses. If A2 is the compressed address, then $N_{compressed}$ will be at most O2+(16−L2)+(16−O2+L2)=16, since comparison would first compare "pre-offset" bytes (O2), followed by comparison (testing) of zero bytes (16−L2), followed by comparison of "post-offset" bytes (16−O2+L2). $N_{uncompressed}$ would be equal, as a similar comparison progression would apply. For example, as is shown in FIG. 16b, whether Address4 is compared in uncompressed format or in compressed format, comparison would still require comparing/testing the first seven bytes of Address3.

In the preceding specification, the invention has been described with reference to specific preferred exemplary embodiments thereof. It will, however, be evident that various modifications and changes may be made thereunto without departing from the broader spirit and scope of the invention as set forth in the claims that follow. For example, elements described herein may be combined or eliminated in various implementations. The specification and drawings are accordingly to be regarded in an illustrative rather than restrictive sense.

What is claimed is:

1. A method performed by a router, the method comprising
determining a first chain location and first chain length of a first chain of zero bytes removed from a first compressed IPv6 address based on compression information of the first compressed IPv6 address, the first compressed IPv6 address having a first number of bytes, including a first number of pre-chain location bytes and a first number of post-chain location bytes;
determining a second chain location and second chain length of a second chain of zero bytes removed from a second compressed IPv6 address based on compression information of the second compressed IPv6 address, the second compressed IPv6 address having a second number of bytes, including a second number of pre-chain location bytes and a second number of post-chain location bytes;
comparing the compression information of the first compressed IPv6 address to the compression information of the second compressed IPv6 address;
when the compression information of the first compressed IPv6 address and the compression information of the second compressed IPv6 address are equal, comparing the first number of bytes to corresponding ones of the second number of bytes, and producing a result;
when the compression information of the first compressed IPv6 address and the compression information of the second compressed IPv6 address are not equal—comparing the first pre-chain location bytes to corresponding ones of the second pre-chain location bytes, and producing the result when at least one pair of such pre-chain corresponding bytes is different;
when no result is produced, comparing the first chain location to the second chain location, and producing the result when the first chain location and the second chain location are not equal;
when no result is produced, comparing the first chain length to the second chain length, and producing the result.

2. The method of claim 1, wherein the result is one of:
the first compressed IPv6 address is larger than the second compressed IPv6 address;
the first compressed IPv6 address is smaller than the second compressed IPv6 address; and
the first compressed IPv6 address is equal to the second compressed IPv6 address.

3. The method of claim 1, wherein the comparison steps are performed one byte at a time, and upon producing the result, no further comparisons take place.

4. The method of claim 1, wherein at least one of the first number of pre-chain location bytes and second pre-chain location bytes is zero.

5. A computer readable storage medium including a set of instructions executable by a processor, the set of instructions being operable to:
determine a first chain location and first chain length of a first chain of zero bytes removed from a first compressed IPv6 address based on compression information of the first compressed IPv6 address, the first compressed IPv6 address having a first number of bytes, including a first number of pre-chain location bytes and a first number of post-chain location bytes;
determine a second chain location and second chain length of a second chain of zero bytes removed from a second compressed IPv6 address based on compression information of the second compressed IPv6 address, the second compressed IPv6 address having a second number of bytes, including a second number of pre-chain location bytes and a second number of post-chain location bytes;
compare the compression information of the first compressed IPv6 address to the compression information of the second compressed IPv6 address;
when the compression information of the first compressed IPv6 address and the compression information of the second compressed IPv6 address are equal, compare the first number of bytes to corresponding ones of the second number of bytes, and produce a result;
when the compression information of the first compressed IPv6 address and the compression information of the second compressed IPv6 address are not equal—compare the first pre-chain location bytes to corresponding ones of the second pre-chain location bytes, and produce the result when at least one pair of such pre-chain corresponding bytes is different;
when no result is produced, compare the first chain location to the second chain location, and produce the result when the first chain location and the second chain location are not equal;
when no result is produced, compare the first chain length to the second chain length, and produce the result.

6. The computer readable storage medium of claim 5, wherein the result is one of the first compressed IPv6 address is larger than the second compressed IPv6 address, the first compressed IPv6 address is smaller than the second compressed IPv6 address, and the first compressed IPv6 address is equal to the second compressed IPv6 address.

7. The computer readable storage medium of claim 5, wherein the comparison steps are performed one byte at a time, and upon producing the result, no further comparisons take place.

8. The computer readable storage medium of claim 5, wherein at least one of the first number of pre-chain location bytes and second pre-chain location bytes is zero.

* * * * *